United States Patent [19]

Hattwig

[11] 4,418,966
[45] Dec. 6, 1983

[54] PUMP-LESS HYDRAULIC BRAKE SYSTEM FOR AUTOMOBILES

[75] Inventor: Peter Hattwig, Cremlingen, Fed. Rep. of Germany

[73] Assignee: Volkswagenwerk Aktiengesellschaft, Wolfsburg, Fed. Rep. of Germany

[21] Appl. No.: 352,169

[22] Filed: Feb. 25, 1982

[30] Foreign Application Priority Data

Mar. 12, 1981 [DE] Fed. Rep. of Germany ....... 3109372

[51] Int. Cl.³ ............................ B60T 8/26; B60T 8/02
[52] U.S. Cl. ................................... 303/100; 303/6 R; 303/22 R; 303/119
[58] Field of Search ................. 303/119, DIG. 2, 100, 303/111, 6 R, 22 R, 22 A, 115, 113, 91, 92, 93, 98, 99, 102, 96, 97, 13, 6 C, 23 R, 15, 68–69, 24, 117, 118; 188/181 A, 181 R, 181 C, 195, 345

[56] References Cited

U.S. PATENT DOCUMENTS

| | | | |
|---|---|---|---|
| 3,550,966 | 12/1970 | Leiber | 303/119 |
| 3,576,350 | 4/1971 | Larsen | 303/100 |
| 3,832,012 | 8/1974 | Bourgoin | 303/6 R X |
| 3,948,568 | 4/1976 | Leiber | 303/119 X |
| 3,964,794 | 6/1976 | Scholz | 188/195 X |
| 3,980,346 | 9/1976 | Leiber | 303/6 R |
| 4,022,514 | 5/1977 | Kondo et al. | 303/115 |
| 4,269,456 | 5/1981 | Kondo et al. | 303/6 R X |

FOREIGN PATENT DOCUMENTS

| | | |
|---|---|---|
| 2101404 | 5/1972 | Fed. Rep. of Germany . |
| 2307623 | 8/1974 | Fed. Rep. of Germany ...... 303/111 |
| 2614180 | 10/1977 | Fed. Rep. of Germany . |
| 2622746 | 11/1977 | Fed. Rep. of Germany . |
| 2851107 | 6/1980 | Fed. Rep. of Germany . |
| 2926227 | 1/1981 | Fed. Rep. of Germany . |

Primary Examiner—Douglas C. Butler
Attorney, Agent, or Firm—Brumbaugh, Graves, Donohue & Raymond

[57] ABSTRACT

A pump-less hydraulic brake system has a pair of independent brake lines, each connected to diagonally opposed front and rear wheel brakes, and a control valve mechanism disposed in each brake line. Each control valve mechanism has an electrically connectable inlet valve and outlet valve, actuatable to one of three combinations: (1) in which brake line pressure is determined by the brake pedal-actuated master cylinder; (2) in which the braking pressure in the respective brake line drops, and (3) in which the braking pressure remains steady. A pair of rear brake inlet valves are also provided, and the valves are controlled as a function of the relative rpm or changes in deceleration of the vehicle wheels. The rear brake inlet valves are also independently controlled, to limit maximum braking pressure to the rear wheel brake, as a function of rear axle weight. No more than one vehicle wheel locks at a give time, and vehicle stability and maneuverability, in combination with relatively high braking pressures, are assured.

6 Claims, 3 Drawing Figures

PUMP-LESS HYDRAULIC BRAKE SYSTEM FOR AUTOMOBILES

BACKGROUND OF THE INVENTION

The present invention is directed to a pump-less hydraulic brake system for automobiles having two, diagonally divided brake circuits which are independent of one another.

For maximum safety, an automobile should be able to brake in the shortest possible distance under various instantaneous road conditions and vehicle weights. In stopping, the directional control of the vehicle is conditioned on the lateral guidance of the rear wheels. Maneuverability of the vehicle is conditioned on good lateral guidance provided by the front wheels, and should not be impaired. However, of the two directional stability is normally accorded the greater importance, and to attain such stability, a defined brake power distribution among the vehicle wheels is required under the particular weight conditions and for all types of braking of the vehicle.

The defined brake power distribution can be achieved with an automatic anti-lock system through the direct adjustment of the brake power distribution to the admissible slip between tire and roadway, i.e., adjustment to prevent locking of any of the vehicle wheels on braking.

The apparatus required and expense involved in providing an ideal automatic anti-lock system is considerable, and such a system has heretofore been used only in high speed and technologically sophisticated vehicles. As a result, attempts have been made to simplify the ideal automatic-anti-lock system, for example, by employing a diagonal control system or a rear axle control system. However, even the simplified anti-lock systems have not realized any considerable cost savings, as compared with the ideal systems, and at the same time they suffer from considerable functional shortcomings.

In an automatic anti-lock system with a diagonal control system, wheel sensors are provided in one of the two diagonal brake circuits and the brake pressure is controlled only in that one circuit. In such a manner, locking of the vehicle wheels associated with the controlled fluid line is prevented such that at all times a diagonally opposite front and rear wheel will not lock. This economy-type system offers improved operation under certain conditions, for example, when driving in a straight line, as compared with no system at all. However, on curved roadways, the direction of the curve determines the behavior of a vehicle thus equipped, in that only one of the diagonal brake lines has the anti-lock system present. Depending upon whether the car is braked in a right-hand curve or in a left-hand curve, the outside front wheel may lock if it is the one in the non-controlled brake circuit. If upon traversing a curve the outside front wheel happens to be in the non-governed brake line and locks, the maneuverability of the vehicle is considerably hampered. In the same system, on travelling through an oppositely directed curve, the outside rear wheel would be in the non-controlled brake line and thus can lock. If the outside rear wheel locks, the stability of the vehicle would be considerably impaired.

Due to the above described shortcomings, at the present time automatic anti-lock systems of any construction are currently employed only in comparative rare cases. Conventional brake systems currently utilized in most vehicles thus normally employ only a fixed brake power distribution among all the wheels, or employ a load-dependent rear brake power control, in the form of brake pressure reducers or brake pressure limiters, in order to prevent the rear wheels from locking before the front wheels. There is a considerably technological gap between brake systems employing an ideal automatic anti-lock arrangement and conventional brake systems with load-dependent brake power regulators or fixed brake power distribution.

SUMMARY OF THE INVENTION

The present invention is a pump-less hydraulic brake system for automobiles having a pair of diagonally crossed, independent brake lines, which substantially retains the advantages of a brake system with an ideal automatic anti-lock arrangement, i.e., preservation of maneuverability and stability of the vehicle, while at the same time facilitating brake pressures which are high in comparison to those of conventional brake systems, without the need of a corresponding substantial outlay in cost and equipment.

In accordance with the present invention, a control valve is disposed in each of the brake fluid lines. Each control valve mechanism has a valve portion for controlling the flow of pressurized hydraulic fluid from the master cylinder into the brake line, i.e. an electrically connectable inlet valve, and a valve portion for permitting pressurized fluid to flow out of the brake line, i.e. an electrically connectable outlet valve. The valves are selectively actuatable to one of three combinations: (1) one in which the fluid pressure in the respective brake line follows the pressure predetermined by the master brake cylinder (i.e. inlet valve open and outlet valve closed); (2) one in which the fluid pressure in the respective brake line drops (i.e. inlet valve closed to block pressurized fluid from the master cylinder, and outlet valve open to vent fluid in the brake line), and (3) one in which the fluid pressure in the respective brake line remains at the pressure prevailing at the start of the third combination (i.e. both valves closed to block any flow). In addition to the two control valve mechanisms, a pair of electrically connectable rear brake inlet valves, for controlling the flow of pressurized fluid to the rear brakes, are disposed in the portion of each brake line leading to its respective rear wheel brake. When either of the rear brake inlet valves is actuated, the fluid line leading to the corresponding rear wheel brake is blocked, such that the fluid pressure to the rear wheel brake is limited to that prevailing when the valve is closed, and does not increase if the brake pedal is further depressed. The inlet and rear brake inlet valves are "one way" valves, in that when actuated they block the flow in one direction, i.e., to prevent pressure increase downstream of the valve. If, however, the upstream pressure drops, e.g., by releasing the brake pedal (valve 5E) or by opening outlet valve 5A, which lowers the brake line pressure upstream of valves 7, back flow is permitted to relieve downstream fluid pressure.

Each vehicle wheel is provided with a sensor for detecting the respective wheel's rotational speed and angular deceleration. Signals from the speed and deceleration sensors are fed into a control circuit, which selectively actuates the inlet and outlet valves of the control valve mechanisms, and also the rear brake inlet valves, as a function of either the magnitude of the speed and deceleration signals, or of the ratio of the signals. The control circuit is arranged so that at any given time only one of the two control valve mechanisms is actuated to the second combination. The rear brake inlet valves are also controlled by vehicle weight sensors independent of other control commands to the rear brake inlet valves.

In the preferred form of the invention, the control circuit is programmed to actuate both of the rear brake inlet valves when any one of the vehicle wheels starts to lock. After a first vehicle wheel has locked, upon the detection of a second vehicle wheel locking, the control circuit actuates the control valve mechanism in the brake line associated with either the first locking wheel, if the first locking wheel was a front wheel, or the second locking wheel if the first locking wheel was a rear wheel. In other words, when the vehicle wheel locking first is a front wheel, when a second wheel starts to lock the control valve mechansim associated with the first-locking front wheel is actuated. Conversely, when a rear wheel locks first, the valve mechanism associated with the second locking (e.g., front) wheel is actuated. The appropriate control valve is actuated first to the second valve combination (to reduce fluid pressure in the brake line of the locked wheel) and thereafter, once the locked wheel again starts to rotate, into the third combination (to stabilize the braking pressure).

Preferably, a pressure sensor is arranged in each of the brake lines, and delivers a pressure-dependent input signal to the control circuit. When either of the control valves is in the second valve combination, the control circuit shifts from the second to the third combination upon reaching a predetermined drop in the fluid pressure in the respective brake line.

Preferably, the control circuit is programmed such that, if when one of the brake lines shifts from the second combination to the third valve combination, the pressure in the actuated brake line drops below a set minimum, the control circuit actuates the control valve mechanism associated with the other brake line, to the third combination, when the pressure in the other brake line exceeds a given pressure value above the set minimum, so as to avoid a disproportionate rise in the brake pressure of the unregulated brake line.

In accordance with another preferred feature of the present invention, the control circuit deactuates the rear brake inlet valves and the two control valve mechanisms whenever the first and second control valve mechanisms, alternating with each other, have been switched a predetermined number of times into the second valve combination. Also, such valves are deactuated by the control circuit upon detection of a sudden increase in vehicle deceleration of a predetermined magnitude indicative of improved surface friction.

In accordance with the present invention, the brake power distribution of the brake system can resemble in its design that of a system with weight dependent brake pressure reducers in which the functioning of the otherwise required brake pressure reducer is performed by the rear brake inlet valves. Moreover, the fact that no hydraulic pump is required for the present brake system is of special advantage.

For a better understanding of the invention, reference is made to the following detailed description of a preferred embodiment, taken in conjunction with the drawings accompanying the application.

DETAILED DESCRIPTION OF A PREFERRED EMBODIMENT

Figure 1:
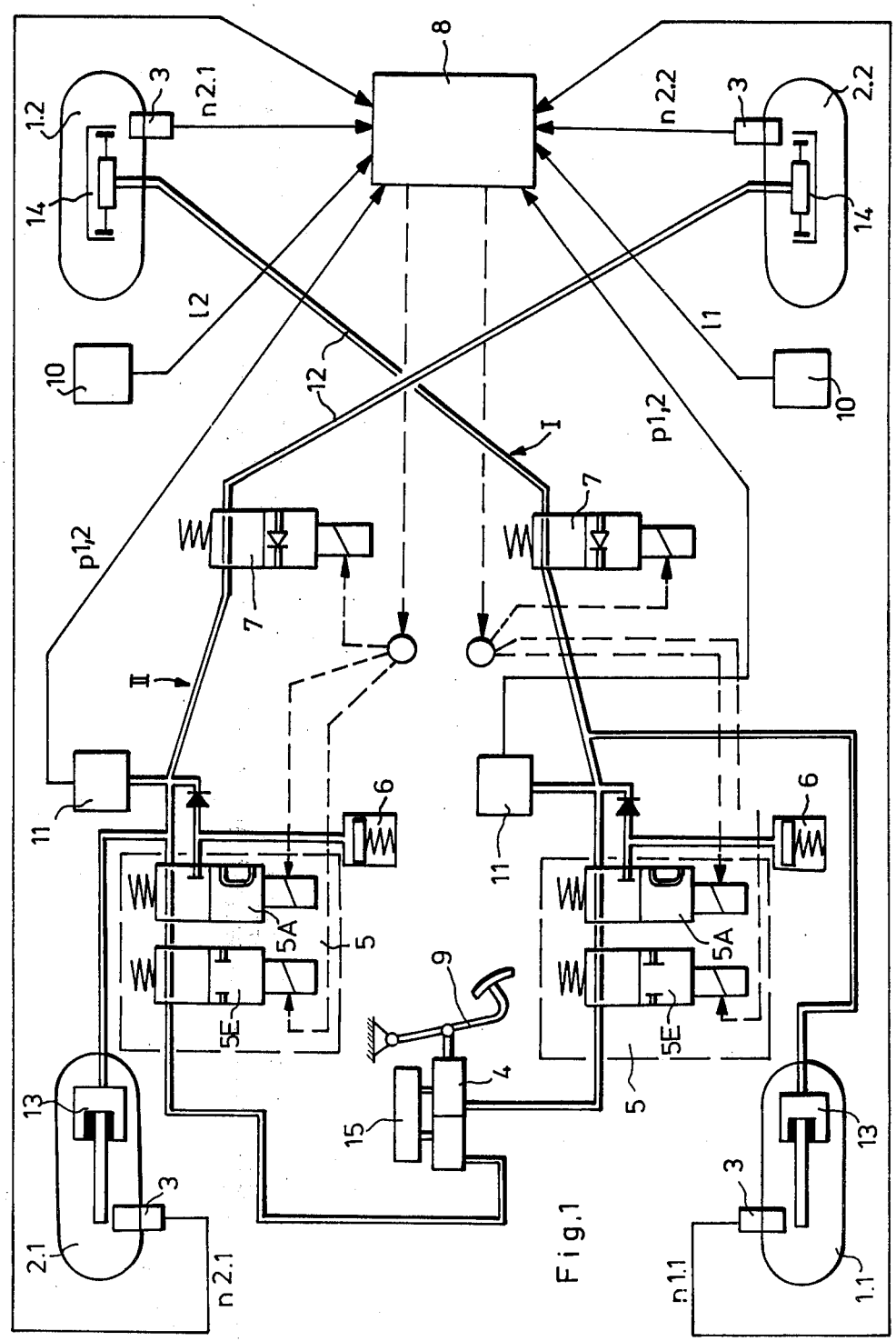
FIG. 1 is a schematic representation of a hydraulic brake system in accordance with the invention.

As shown in FIG. 1, a hydraulic brake system of an automobile has two diagonally divided, independent brake lines designated I and II. The brake line I is associated with one of the front wheels 1.1 and a diagonally opposite rear wheel 1.2. The second brake line II is connected to the other front wheel 2.1 and the rear wheel 2.2. A conventional master brake cylinder 4, actuatable by the brake pedal 9, provides pressurize fluid to each of the brake lines I and II. Optionally, if desired, a brake servo unit may be interposed to assist in braking.

A control valve mechanism 5 is disposed in each of the two brake lines I and II. Each control valve mechanism 5 has an inlet valve part 5E and an outlet part 5A. In each case, the inlet valve 5E is provided for selectively blocking the flow of pressurized hydraulic fluid from the master cylinder 4 to the vehicle brakes, whereas the outlet valves 5A are provided for selectively venting pressurized fluid in the fluid lines I and II for selectively reducing the braking pressure. In the illustrated example, the two valve parts 5E and 5A are formed spacially separated. Evidently, inlet and outlet valves may be utilized as well as an integral valve unit. As discussed above, the inlet valves 5E block or check the flow in one direction. By means of such valves, the hydraulic lines can be divided in such a manner that the pressure in the line portion downstream of the valve cannot further increase in spite of a further pressure increase upstream of the valve, i.e., as occurs upon further depressing the brake pedal 9. However, a pressure reduction, in the case of a corresponding pressure reduction downstream of the valve, is possible. By use of the outlet valve, the pressure in the line portion downstream of the outlet valve can be reduced below the inlet (master cylinder) pressure, whereby the drained brake fluid is conducted, for example, into a temporary storage chamber 6. Following release of the brake pedal, the stored fluid can again flow back into the hydraulic system proper.

Each of the brake lines has a portion 12 leading from tha valve 5 to the brakes of the rear wheels 1.2 and 2.2. A rear brake inlet valve 7 is disposed in each brake line portion 12 to fulfill the double function. First, as described further on the valves 7 are controlled by controller 8 as part of the wheel lock responsive brake pressure regulation. Second, such valves act as weight-dependent brake pressure limiting valves, or brake limiters. The brake power distribution of the brake system, as between front and rear wheels, is regulated in the same manner as in a system having weight-dependent brake pressure reducing valves. For detection of the vehicle weight, a weight sensor 10, for example an electric limit switch, is associated with each of the rear wheels 1.2 and 2.2.

Figure 2:
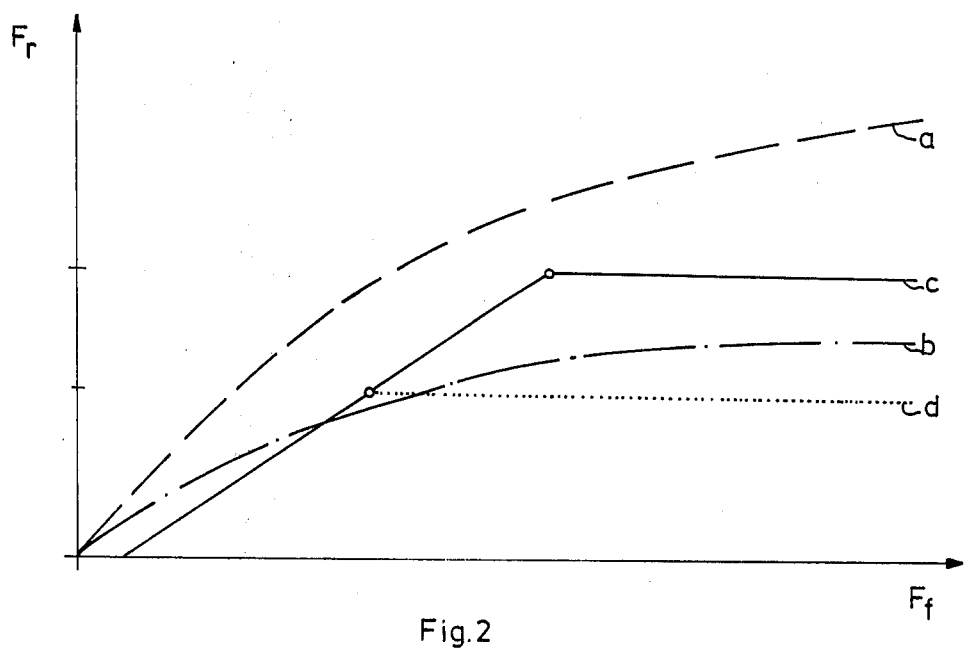
FIG. 2 is a diagram illustrating preferred braking power of the rear wheels as a function of the braking power of the front wheels.

Referring to FIG. 2 an ideal brake power distribution as between the front and rear axles, $F_f$ and $F_r$, respectively, is illustrated by dashed line a for a fully loaded vehicle and by the dotted/dashed line b for an empty vehicle. In practical control systems, characteristics which approximate the ideal characteristics, for example, for no load the dotted curve d and for a medium load of the vehicle, the solid curve c, are normally used. Depending on the type and size of the vehicle and the desired brake power distribution, the change over point, i.e., the bend point of the characteristic, may be located, by way of example, at no load at approximately 30 bar and at the aforementioned medium load at approximately 50 bar.

A weight-dependent limitation of the braking power of the rear wheels (e.g., 30 bar and 50 bar), customary in such conventional brake systems, is employed also in the hydraulic brake system in accordance with the invention. Vehicle weight is detected by load sensors 10, which in turn are connected to limit the pressure in the wheel brake cylinders of the rear wheels 1.2 and 2.2 by closing, upon reaching the maximum predetermined rear wheel braking pressure, the valves 7. The predetermined maximum rear brake force, i.e., the point at which valves 7 are closed to prevent any further increase in hydraulic braking pressure reaching the rear wheels, is determined in accordance with the characteristics of curves d and c in FIG. 2. However, in addition to limiting the maximum rear wheel braking force, the rear brake inlet valves 7 also are controlled by the general brake control system, independently of the weight-dependent control, as described below.

The inlet and outlet valve parts 5E and 5A of the two valve mechanisms 5 are electrically and individually actuatable. The two rear brake inlet valves 7 are also actuatable electrically.

The actuation of the valves is controlled by an electronic analyzing and control circuit 8. The control circuit 8 is comprised of electronic and logic components in themselves known, for example a microprocessor such as Model No. 6802 (8048) manufactured by Motorola (Intel). In addition to opening and closing the rear brake inlet valves 7, the control circuit 8 selectively actuates the control valves 5 such that each inlet and outlet valve pair, 5E and 5A, is in one of three selected combinations: in the first control combination, the inlet valve part 5E is open, and the outlet valve part 5A is closed (i.e., blocking), such that the hydraulic pressure in the brake line associated with a respective valve mechanism 5 is the pressure delivered from the master brake cylinder 4 resulting from the actuation of the brake pedal 9. In a second control combination, the outlet valve part 5A is opened, and pressure in the fluid line downstream of the valve is reduced, since fluid in the line is vented to the reservoir 6. Finally, the control circuit 8 can actuate the control valve 5 into a third control combination in which both the inlet valve part 5E and outlet valve part 5A are closed, such that the pressure in the brake line downstream of the valve mechanism 5 remains at the pressure value which prevailed upon actuation of the third control combination, i.e., remains steady. The inlet valves 7 are also connected to the electronic analyzing and control circuit 8, and controlled by the circuit in the manner described below. The latter control of the valves 7 occurs independent of a possible load-dependent actuation thereof.

The control circuit 8 operates responsive to a plurality of input signals. A sensor 3 is associated with each of the individual wheels 1.1, 1.2, 2.1, 2.2. The sensors 3 detect the rotational speed of each wheel, and feed corresponding output signals n1.1, n1.2, n2.1, n2.2 to the electronic analyzing and control circuit 8. The rear brake inlet valves 7 as well as the two valve mechanisms 5 are connected and disconnected by the control circuit 8 as a function of the magnitude and/or the magnitude ratio of the input signals, or signals derived therefrom.

Changes in the rotational speed of the various wheels indicate, when above certain limits, the locking of the respective wheel. However, differences in rotational speed also occur when the vehicle goes around a curve, without any locking of the wheels. It is, therefore, difficult to fix a minimum value for the rotational speed difference as an indication of wheel locking. Preferably, in addition to the rotational speed differences, the angular deceleration of the individual wheels is determined, and a determination of wheel locking is made from both the angular deceleration and the differences in rotational speed among the wheels. The angular deceleration of the wheels can be determined, for example, by forming the differential of the rotational speed signals as a function of time in the electronic analyzing circuit 8. It is also difficult to determine the locking of one of the wheels merely on the basis of the degree of angular deceleration since, for example, when roads are in very bad condition, very high angular decelerations may occur at times due to the rough roads, which if used as a singular indication of wheel locking would result in an erroneous determination.

When any one of the four vehicle wheels starts to lock, the electronic analyzing and control circuit 8 actuates simultaneously both rear brake inlet valves 7. The control circuit 8 does not issue at this time any further connection or control orders. Upon actuation of the rear brake inlet valves 7, the rear brake line portions 12 are (one way) blocked so that the pressure of the hydraulic fluid in the wheel brake cylinders of the brakes of the rear wheels 1.2 and 2.2 cannot increase any further. At the time the control circit 8 generates electrical actuation signals to close the valves 7, as described in the previous paragraph, it is possible that such valves 7 are already actuated (closed). This can occur inasmuch as the two rear brake inlet valves 7 are controlled independently as weight dependent limiter valves, i.e., can be connected independent of the control circuit 8, in accordance with the curves c and d of FIG. 2. Thus, depending on the vehicle weight and magnitude of the hydraulic fluid pressure from the master brake cylinder 4 prevalent at the time the wheel locking is detected, the valves 7 may already have been closed.

By the aforedescribed pressure limitation at the rear axle, in which both valves 7 are closed upon detection of locking of any of the vehicle wheels, at least one rear wheel is assured of running freely so that the stability of the vehicle is preserved. The definite locking of the wheel, whose sensor output signals cause the pressure limitation at the rear axle, i.e., actuation of the valves 7, is not avoided in all cases by the connection of the inlet valves 7. If the locking wheel happens to be a front wheel, the pressure limitation by the closing of valve 7 does not prevent the locking of the wheel concerned (i.e., the front wheel) since no corrective measures are initiated by the control circuit at such time. In the case where the locking wheel is a rear wheel, actuation of the valve 7 will occur in sufficient time to prevent the locking wheel from becoming locked only if the response values of the electronic analyzing and control circuit have been chosen sufficiently low. However, locking of one of the wheels can be accepted without any injurious effect on maneuverability or on directional stability.

In the event that a second one of the vehicle wheels 1.1, 1.2, 2.1 or 2.2 starts to lock, the analyzing and control circuit 8 actuates, in addition to the two rear brake inlet valves 7, the valve mechanism 5 in one of the two diagonal brake circuits I or II, doing so initially in the second control combination (which initiates a reduction of hydraulic pressure in the actuated brake line I or II). Since the valves 7 are one way valves, while increased pressure in the brake lines cannot be transmitted to the rear brakes, reduction of the brake line pressure results in a corresponding decrease in the rear brake pressure. The particular brake line, I or II, upon which pressure corrective measures are initiated, is determined in the manner described further on.

When the fluid pressure in the actuated hydraulic line I or II has been reduced by a predetermined amount, the control circuit 8 shifts the subject valve mechanism 5 to the third control combination in which the hydraulic pressure of the actuated brake line is stablized. Assuming that road and operating conditions remain unchanged, this control state is not changed until the end of the braking process is attained.

The hydraulic pressure in the actuated brake line I or II can be reduced either by a fixed set value, for example 15 bar, or reduced until the locked wheel begins again to rotate (due to the reduction in braking pressure in the line), as detected by the sensor 3 associated with the locking wheel. When either the braking pressure has been reduced by the predetermined amount, or sensor 3 detects the wheel as again starting to rotate, the valve mechanism 5 is shifted to the third combination in which both the outlet valve part 5A and the inlet valve part 5E are closed. Thus, the pressure reduction constitutes a limited regulation process and proceeds in a manner similar to that of the known automatic anti-lock systems.

When the outlet valve part 5A is actuated (opened), the brake fluid which is drained from the associated brake fluid line, in order to reduce the pressure in the line, is discharged into a storage chamber 6, which preferably is associated directly with each of the valve mechanisms 5 concerned. After the brake pedal 9 is released, the fluid is again emptied into the associated brake line I or II. For reasons of safety, the hydraulic pressure is reduced at any one time in each case in only one of the two brake circuits I or II.

As described above, upon detection of the onset of locking of a second of the vehicle wheels, the control circuit 8 actuates the control valve 5 in one of the brake lines, brake line I or brake line II. In order to achieve the best possible operating and braking behavior of the vehicle at all possible road and operating conditions, and to assure that stability of the vehicle on braking has priority over steering ability, the brake line upon which the electronic analyzing and control circuit 8 acts depends on which of the wheels was the first to lock.

If the vehicle wheel which locked first and which caused the actuation of the rear brake inlet valves 7 was a front wheel, as soon as a second vehicle wheel starts to lock the control circuit 8 actuates the valve mechanism 5 in the brake circuit associated with the vehicle wheel that locked first (i.e. the front wheel). Thus, if the first wheel to lock was front wheel 1.1, when a second wheel locks the pressure is reduced in the brake circuit I. If the front wheel 2.1 is the first wheel to start to lock, as soon as the second wheel starts to lock the pressure will be reduced at brake circuit II.

However, if the first wheel to lock was one of the rear wheels, when a second wheel starts to lock the control circuit 8 actuates the valve mechanism 5 of the brake circuit I or II associated with the second locking vehicle wheel. Thus, if the rear wheel 1.2 locks first, and the front wheel 2.1 thereafter starts to lock, pressure is reduced in the brake circuit II.

In accordance with the above-described braking system, the vehicle can be controlled on braking in any operating situation which may occur, and in borderline situations directional control of the vehicle is given priority over manueverability. The vehicle can safely be braked at braking pressures at which vehicles with conventional brake systems would normally lock very rapidly.

In order to illustrate the operation of the present invention, several practical driving situations are discussed below.

(A) Smooth, Straight Road With A High Coefficient Of Friction

Under such road conditions, it is unlikely that the rear brakes would lock. Pressurized hydraulic fluid from the master cylinder would be delivered to the brakes of all the wheels up to about 30 bars at minimum vehicle weight conditions, and up to about 50 bars under medium weight conditions (corresponding to curves C and D of FIG. 2). Upon reaching such braking pressures, the controller 8, which acts responsive to signals corresponding to axle weight as derived from the weight sensors 10, actuates (closes) the valves 7 so as to prevent any further increase in the pressure of the braking fluid delivered to the rear brakes. Thus, even if the brake pedal 9 is depressed further, resulting in an increase in the braking pressure delivered to the front wheel brakes, the brakes of the rear wheels 1.2 and 2.2 cannot lock since, under smooth road, high frictional coefficient conditions, presumably none of the wheels lock at less than the 30 bar and 50 bar conditions, respectively.

Therefore, if any of the wheels start to lock, it must be assumed that the braking pressure has been increased above the 30 and 50 bar limits, and that therefore one of the two front wheels (the only wheels receiving the increased fluid pressure from the master cylinder 4) are the ones to lock. By way of example, if the front wheel 2.1 starts to lock, the locking would be signaled to the electronic analyzing and control circuit 8 by an output signal n2.1 of the associated sensor 3. The control circuit 8 emits a signal to close the two rear wheel inlet valves 7, but the two inlet valves 7 are already actuated by the weight dependent signal derived from sensors 10. Therefore, no direct consequence would follow from the point of view of controlling the braking operation, since the two sets of actuation signals to the valve 7 from the control circuit 8, i.e., the weight pressure dependent signal and the wheel-locking derived signal, are repetitive.

Similarly, the increasing brake pressure to the two front wheels, including the pressure of the front wheel tending to lock, would not be affected at this phase by the electronic control circuit 8. Thus, the front wheel concerned can possibly lock. This does not have any negative influence on the directional control or maneuverability in that the stability is assured by the freely running rear wheels and the maneuverability is assured by the other, freely running, front wheel. Effective braking is assured by the one front wheel acted on by the full brake pressure, and on the other hand, by the freely running rear wheels acted on by limited pressure (e.g., 30 or 50 bars).

If on further increase of the braking pressure, delivered from the master cylinder 4, the second of the front wheels, i.e., the wheel 1.1, starts to lock, the locking is signaled to the electronic analyzing and control circuit 8 by the associated sensor 3, upon attainment of a defined critical threshold value for the angular deceleration of the wheel concerned, in the form of the output signal n1.1. Thereupon, the electronic control circuit 8 connects the valve mechanism 5 in the brake line II containing the front wheel 2.1, which locked first. The valve mechanism 5, associated with brake circuit II, is actuated first to the second control combination, and thereafter to the third control combination. In the second control combination, the hydraulic pressure in the brake line II is reduced by venting fluid through the opened outlet valve part 5A until the front wheel 2.2 again begins to rotate. Thereafter, the control valve 5 is moved to the third combination, wherein the braking pressure to the now freed front wheel 2.2 remains steady by maintaining closed both the outlet valve part 5A and also the inlet valve part 5E, such that pressurized fluid from the master cylinder 4 is blocked.

Under these driving conditions as well, the stability and maneuverability of the braking vehicle are fully assured.

(B) Smooth, Straight Road With A Low Frictional Coefficient

In the case of road conditions in example (A), with a high frictional coefficient, the hydraulic braking pressures could be raised to the weight-dependent changeover points on curve c and d of FIG. 2, without any locking tendency of the vehicle wheels (front or rear). As described above, under such conditions braking pressure to the rear wheels would reach the maximum permitted by the independent weight dependent pressure regulator, before such wheels began to lock, and any locking would occur in the front wheels.

On the same type of road, but under conditions of low coefficient of friction (e.g., wet or snow-covered) one of the rear wheels may lock first prior to reaching the weight-dependent pressure cut-off (30 or 50 bars). By way of example, if rear wheel 1.2 is the first wheel tending to lock, the control circuit 8 actuates both rear brake inlet valves 7 so that the pressure in the wheel brake cylinders of the two rear wheels 1.2 and 2.2 is limited to the pressure prevailing at such time. It is true that the locking rear wheel 1.2 is not released; however, the locking of the second rear wheel 2.2, which apparently runs under more favorable frictional conditions, is prevented. Thus, in this phase the stability of the vehicle is assured as is the maneuverability.

Assuming that road conditions have not changed, the freely running second rear wheel does not lock, even if the pressure in the brake circuits I and II increases further, in that the pressure delivered to the rear axle is limited by the now shut inlet valve 7. Therefore, assuming road conditions remain unchanged, the second wheel to lock will be one of the front wheels 1.1 or 2.1.

In practice, generally it will be the front wheel on the same vehicle side as the locking rear wheel which tends to lock, i.e. the front wheel 2.1. This occurs since the road conditions on this side of the roadway are probably worse than those on the other side.

When the front wheel 2.1 begins to lock, due to the fact that the first wheel to lock was one of the rear wheels, the electronic analyzing and control circuit 8 connects the valve mechanism 5 associated with the diagonal brake circuit II, which contains the second-locking front wheel 2.1. Hydraulic pressure in the brake circuit II is reduced in the manner described above until both wheels in this brake circuit run freely again. Thereafter, the braking pressure is stabilized at this pressure value.

If the conditions of the road change, the second wheel tending to lock may not be the front wheel 2.1, but rather the other, freely running rear wheel 2.2, e.g., because the frictional coefficient on that side of the road has decreased. However, the same control process occurs, i.e., the pressure in the brake circuit II is reduced such that the front wheel 2.1 and rear wheel 2.2 can run freely. A favorable braking distance, good maneuverability, and good stability are assured because the second-to-lock rear wheel, wheel 2.2, enjoying the higher coefficient of friction, is freed to rotate.

If under the instant road conditions (slippery surface) it is not a rear wheel but a front wheel that locks first (which as a rule occurs more frequently), the electronic control circuit 8, as described above, actuates the rear brake inlet valve 7 to limit the brake pressure of the rear axle. In other respects, the process is the same as described above in example (A). Upon locking of a second wheel, the brake circuit which contains the front wheel locking first is acted on by the controller 8, and the braking pressure in the subject brake line is reduced. This means that the rear wheel 2.2 associated with the same brake line and diagonally opposite of the front wheel that is unlocked by the control valve mechanism 5, also is assured of rotating. Normally, the frictional values on the side of the road of the first-to-lock front wheel are worse than those on the other side of the vehicle. Thus, the aforedescribed control assures that the rear wheel which cooperates with the better frictional surface rotates so that the stability of the vehicle remains good.

(C) Straight, High Frictional Coefficient Road, Changing To A Slippery Road

In the present example, it is assumed that the road has a coefficient of friction jumping from very high to very low value, with a vehicle travelling straight ahead on the road.

On the road portion having a high coefficient of friction, the weight-dependent control actuates the pressure limiting valves 7 associated with the rear axle, and therefore it is one of the front wheels which, as in the case of example (A), locks first. When one of the front wheels locks, the braking pressure (to the front wheel brakes only, the rear wheels being pressure limited) is not caused to be reduced. As soon as the second front wheel starts to lock, the pressure in the brake circuit associated with the first locking front wheel is reduced and subsequently limited so that the first-to-lock front wheel again rotates while the second-to-lock front wheel associated with the non-pressure controlled brake line continues locking.

If thereafter while braking the road becomes slippery, such that the coefficient of friction decreases, one of the wheels previously rotating, as a rule one of the rear wheels, may start to lock. In this case as between the two locked wheels the locked front wheel is now considered the first-to-lock wheel. The electronic analyzing and control circuit 8, therefore, deactuates the previously actuated valve mechanism 5 in the brake circuit with the controlled pressure, and connects the valve mechanism 5 in the other brake line, associated with the locked front wheel, in which until then the pressure has not been regulated. In the latter brake circuit, the pressure is first reduced and then stabilized in the manner described above. The front wheel which has been locking until then, (which in the first control operation had been considered the second locking wheel but is now considered the first-to-lock of the two locked wheels), can now run freely again. The shifting of pressure reduction from one diagonal brake line to the other takes place in the present case because, upon detection of this signal corresponding to the locking of the third wheel (since the braking process was initiated), it is now the second wheel to lock which, for the purpose of the regulating process, is considered the wheel which locks first. Thus, the brake circuit containing the second locked wheel, but which is the first to lock as between the second and third locked wheels, is reduced in pressure.

(D) A Straight Road With A Frictional Value Jumping From Low To High

These conditions may prevail in, for example, wintry driving conditions when the vehicle is braked on glazed frost or snow, or is braked on a very wet road, and subsequently arrives on a dry or less slippery road portion. Under such conditions, one of the rear wheels may start to lock at relatively low brake pressures, such that the weight-dependent pressure limitation of the rear axle would not yet have been actuated. As a result of the wheel locking, both rear brake inlet valves 7 would be actuated by the controller 8, such that the pressure in the rear axle would be limited as under example (B). Once the valves 7 are actuated, the other rear wheel does not lock and the stability of the vehicle is preserved.

If the braking pressure is increased further, one of the front wheels may lock. As a rule, the front wheel on the same vehicle side as the locked rear wheel will start to lock due to similarity of road conditions on that side of the vehicle. The electronic control circuit 8 actuates the control valve mechanism 5 in the brake circuit containing the front wheel, which is the second wheel to lock, and the pressure is reduced through the actuation process of the valve mechanism 5. Once the locked front wheel again begins to rotate, the valve mechanism 5 is shifted to the third condition whereafter the braking pressure is stabilized at the pressure below which the wheel locks. The freed and now rotating front wheel, and associated rear wheel, cooperating under the better frictional conditions, would then be able to run freely due to the pressure drop. Thus, both a directional control and maneuverability of the vehicle are assured.

If the pressure in the brake circuit which was not pressure-reduced and limited were to increase further due to a corresponding actuation of the brake pedal 9, the other front wheel would tend to lock. Such locking would not cause direct corrective action by the control circuit 8 since the front wheel associated with the pressure-reduced circuit is considered the wheel locking first. Accordingly, it would be then possible that on further actuation of the brake pedal, the brake pressure in the wheel brake cylinder of the second locking front wheel would be increased to such an extent that, absent the additional control described below, the said wheel would remain locked, even if the frictional value of the road would suddenly be much higher.

In the example of the embodiment represented in FIG. 1, a pressure sensor 11 is arranged in each of the diagonal brake circuits I and II influenced by valve mechanism 5. The pressure sensors 11 detect the pressure prevailing in each brake line I and II and generate input signals p1 and p2 to the electronic analyzing and control circuit 8.

If the stabilized pressure in the controlled brake line, i.e., the reduced pressure in the brake line following the shift of valve mechanism 5 from the second control combination to the pressure-limiting third control combination, is below a predetermined pressure value, for example 30 bar, the pressure in the other brake line is not permitted to rise uncontrolled. Instead, the control circuit 8 actuates the valve mechanism 5 in the other brake line II into the third control combination, to prevent any further pressure increase from reaching the brake, as soon as the pressure in the second brake circuit rises to a second preselected value, for example 50 bar.

This latter control measure prevents the pressure in the wheel cylinder of the later-locking front wheel, which is not contained in the pressure-reduced brake circuit, from rising to disproportionately high, and undesirable, pressure values. Thus, if the vehicle during the braking process advances to a road portion with better friction, the locked wheel would not remain locked, as it would if the brake pressure had been allowed to rise uncontrolled, but would begin to rotate automatically, since the wheel locking pressure at the higher frictional value would be greater than the limited pressure braking value applied.

The renewed running of the previously locking wheel would be signalled to the control circuit 8 by a corresponding change of the output signal delivered by the sensor 3 associated with the wheel. Upon detection of the renewed rotation of the previously locked wheel, for example by falling below a defined rotational speed difference between the sensor output signals received by the control circuit 8, the control circuit 8 automatically releases again the brakes of the vehicle through disconnection of all valves which had been connected. By corresponding actuation of the brake pedal 9 by the vehicle operator, the pressure in the brake system is increased, in particular in the pressure controlled brake circuit with the previously reduced pressure. If subsequently the vehicle wheels again begin to lock, the reduction of the pressure in one of the two brake circuits starts from a higher pressure level, which corresponds to the better road conditions and higher frictional coefficient of the road.

As a result, it is assured that the operator of a vehicle, on braking on slippery or icy road, or aquaplaning, can generate again sufficient braking power upon encountering a subsequent stretch of roadway with a higher frictional coefficient.

Inasmuch as the present brake system operates without a hydraulic pump, the aforedescribed process cannot successively take place indefinitely since, during a braking operation, each time the pressure reduction regulating process occurs a portion of the brake fluid is drained into the associated storage chamber to achieve the requisite pressure reduction. Thus, with each pressure regulation, there remains less and less hydraulic fluid in the master brake cylinder 4 of the brake system, and the available brake pedal travel is curtailed. For reasons of safety, the brake pedal must not be allowed to travel as far as the stop. Therefore, preferably the electronic analyzing and control circuit 8 operates so that, following a predetermined number of pressure adjustments, all the valves 5 and 7 connected by the control circuit 8, are disconnected. Under such conditions, the brake system acts, at least temporarily, like in ordinary brake system without the presence of any control devices, except that even under such conditions, the rear brake inlet valves 7 operate responsive to the weight-dependent signal from weight sensors 10, independent of this disconnection. Thus, the system is like a customary conventional brake system with a weight dependent pressure control of the rear brake pressures.

(E) Change From Straight Road To Cornering During The Braking Process

From the standpoint of the effect on the electronic analyzing and control circuit 8, cornering, which produces a shifting of the load on each of the vehicle wheels, is detected as a difference in the coefficients of friction for the left and right vehicle wheels. The analyzing circuit cannot distinguish between load changes and frictional value changes, as the brake effort corresponds to the product of the coefficient of friction and normal force.

In an illustrative situation, during the braking process the electronic analyzing and control circuit 8 has actuated the rear brake inlet valves 7 so as to limit the pressure in the rear axle, and has actuated the control valve mechanism 5 in one of the two diagonal brake lines such that the pressure has been reduced and thereafter limited so that wheels associated with the brake line of the actuated valve mechanism 5 rotate. But, with further braking, the other front wheel is caused to lock.

Depending on whether the vehicle, starting in this state, enters a right or a left curve, different conditions will result. If on steering into the curve the locked vehicle wheel is one of the inner wheels, the car handles without difficulty since the freely rotating outside wheel, on driving through the curve, would be loaded additionally and thus does not lock. The control circuit 8 would then not have to operate. Both maneuverability and stability of the vehicle are fully assured in this driving situation.

If, in the aforedescribed situation, the vehicle enters a curve in which the locked front wheel is one of the outside wheels, maneuverability is initially considerably limited in that only the less weighted, freely running inside front wheel can transmit lateral forces. The limited maneuverability, however, would be only momentary and not be practically noticeable since the inside front wheel, because of the decrease in weight on the wheel, would rapidly lock. When the inside front wheel locks, the electronic analyzing and control circuit 8 would automatically actuate the valve mechanism 5 in the brake line associated with the locked outside front wheel, since the outside front wheel was the first-to-lock front wheel, so that the outer front wheel begins to rotate again. At the same time, the circuit 8 de-actuates the valve mechanism 5 in the previously pressure-reduced brake circuit, i.e., the brake line associated with the now-locked inside front wheel. Maneuverability and directional control of the vehicle are thus fully assured in this travel condition also.

In order to produce the largest possible braking power, for example, when a braked vehicle travels on a road initially having a low coefficient of friction to a road surface with a higher frictional value, it is possible to equip the vehicle, as a variation of the previously described possibilities, with a deceleration sensor which detects the linear deceleration and delivers to the electronic analyzing and control circuit 8 a corresponding signal such that the circuit 8 disconnects the rear brake inlet valves 7 and the valve mechanisms 5, if either mechanism has been previously connected as a result of output signals delivered by the sensors 3, when the deceleration of the vehicle suddenly shows a noticeable increase. Sudden increase and deceleration is an indication that the condition of the road surface has improved, and now has a higher coefficient of friction, such that higher brake pressures may be generated, which up to this point had been prevented by the pressure reduction and stabilization effected by the valve mechanisms 5.

Figure 3:
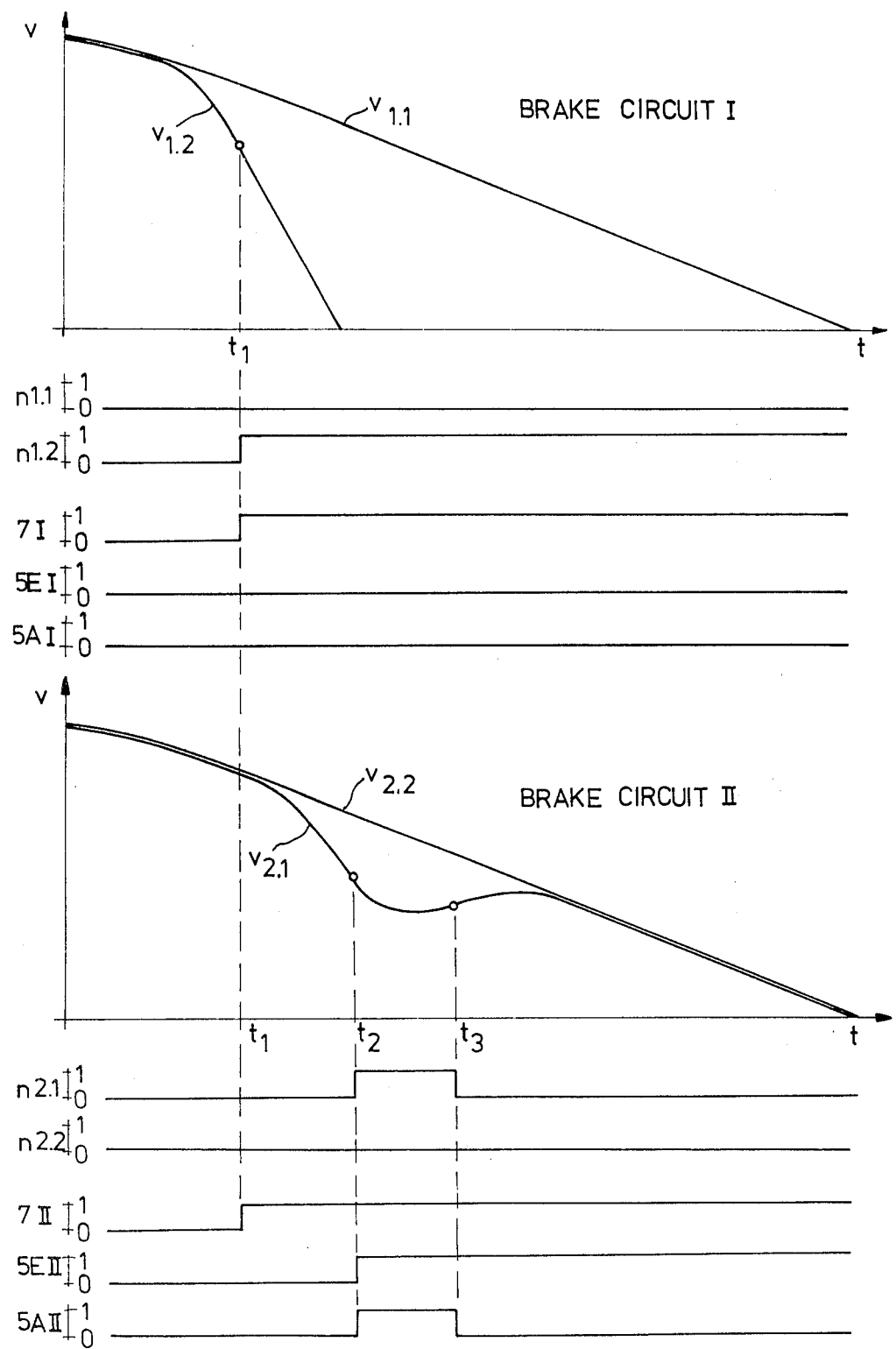
FIG. 3 is a flow chart of a program for controlling the operation of the brake system.

As discussed above, the control signals for actuating the valves 5 and 7 may be generated by a microprocessor forming part of the electronic analyzing and control circuit 8. Preferably, the microprocessor is of the type having a read-only and random access memory. The control functions of the microprocessor are set forth in the flow chart of FIG. 3 wherein is shown by way of example the signal flow situation within the two different brake circuits I (upper part) and II (lower part), respectively, during the driving situation discussed in the first part of Example (B).

Because of braking, the velocity v of the wheels 1.1 and 1.2 of the first brake circuit I decreases as well as that of the wheels 2.1 and 2.2 within the second brake cirduit II. When assumed that the rear wheel 1.2 at the point of time $t_1$ is tending to lock, the sensor signal n 1.2 is changing from its 0-level to its 1-level thereby signalling the locking situation of wheel 1.2. As a result control circuit 8 actuates the inlet valve 7 in circuit I as well as that in circuit II by changing its electrical actuation signals 7I and 7II for these two valves from their 0-level to their 1-level. When thereafter at the point of time $t_2$ the front wheel 2.1 is tending to lock, the sensor signal n 2.1 is changing from 0-level to 1-level signalling this locking situation. As a result control circuit 8 actuates, due to the fact that the first locking wheel was one of the rear wheels, the valve mechanism 5 associated with the diagonal brake circuit II by changing its electrical actuation signals 5EII and 5AII for the inlet valve part 5E and the outlet valve part 5A of the control valve mechanism 5 of circuit II. Hydraulic pressure in the brake circuit II is thereby reduced until both wheels in this brake circuit run freely again. When the locking situation of front wheel 2.1 has finished at $t_3$ the sensor signal n 2.1 changes its level from 1 to 0 whereby the electronic analyzing and control circuit 8 is caused to rechange the electrical actuation signal 5AII for the outlet valve part 5A of the control valve mechanim 5 of circuit II from its 1-level to its 0-level while the control signal 5EII remains on its 1-level. As a result the braking pressure in the respective brake line (here in circuit II) is stabilized at the pressure value prevailing in this line at $t_3$.

In FIG. 1 the several control valve mechanisms 5 and valves 7 are shown in their phase receiving just a 0-level electrical actuation signal by control circuit 8. For completeness in FIG. 1 the front wheel brakes are signed with 13, the rear wheel brakes with 14 and the fluid reservoir of master cylinder 4 with 15.

The foregoing represents a preferred embodiment of the invention. Modifications and variations of the above-described preferred embodiment will be apparent to persons skilled in the art without departing from the inventive concepts disclosed herein. All such modifications and variations are intended to be within the scope of the invention, as defined in the following claims.

I claim:

1. A pump-less hydraulic brake system for vehicles having a pair of front wheels and a pair of rear wheels, and a pair of front wheel brakes and a pair of rear wheel brakes associated therewith, comprising:
   (a) master brake cylinder means for providing pressurized brake fluid;
   (b) a pair of independent brake lines, each connected to receive pressurized fluid from said master cylinder means, wherein each brake line is connected to deliver fluid to one front wheel brake and has a portion to deliver fluid to a diagonally opposed rear wheel brake;
   (c) a control valve means disposed in each of said brake lines, wherein each said control valve means has an electrically connectable inlet valve and an electrically connectable outlet valve, and said inlet and outlet valves in each said control valve means are actuatable to one of a first combination, in which the fluid pressure in the respective brake line follows the pressure predetermined by the master brake cylinder, a second combination, in which the fluid pressure in the respective brake line drops, and a third combination, in which the fluid pressure in the respective brake line remains at the pressure prevailing at the start of said third combination;
   (d) a pair of electrically connectable rear brake inlet valves, one disposed in the portion of each brake line leading to its respective rear wheel brake, which when actuated limits the fluid pressure in the associated rear wheel brake to the pressure prevailing when actuated;
   (e) means responsive to vehicle weight for controlling said rear brake inlet valves independent of other control commands to said rear brake inlet valves;
   (f) sensor means associated with each wheel for detecting the respective wheel's rotational speed and angular deceleration; and
   (g) control circuit means for receiving signals from each said sensor means and for selectively actuating the inlet and outlet valves of said control valve means and said rear brake inlet valves as a function of one of the magnitude of said signals and the ratio of said signals, wherein at any single time only one of the two control valve means is actuatable to said second combination.

2. A brake system as defined in claim 1, wherein said control circuit means has means for actuating both said rear brake inlet valves when any of said vehicle wheels starts to lock, and means, responsive to the detection of a second vehicle wheel locking, for actuating one said control valve means into said second combination and thereafter into said third combination, wherein said control circuit means actuates the control valve means in the brake line associated with the first locking wheel when the vehicle wheel locking first is a front wheel, and actuates the control valve means of the brake line associated with the second locking wheel when a rear wheel locks first.

3. A brake system as defined in claim 2, wherein said control circuit means has means for shifting from said second to said third combination responsive to a predetermined drop in fluid pressure in the respective brake line.

4. A brake system as defined in claim 3, comprising pressure sensor means for detecting the fluid pressure in each brake line for delivering pressure-dependent input signals to said control circuit means, and wherein said control circuit means has means, responsive to a pressure drop below a predetermined value in one brake line, where the associated valve means has shifted from said second combination to said third combination, for actuating the control valve means associated with the other brake line to said third combination when the pressure in said other brake line exceeds a second predetermined pressure value.

5. A brake system as defined in claim 2, 3 or 4, wherein said control circuit means has means for de-actuating all said rear brake inlet valves and said control valve means, actuated responsive to said sensor signals, whenever said first and second control valve means have, alternating with each other, been switched a predetermined number of times into said second combination.

6. A brake system as defined in claim 1, comprising means connected to said control circuit means for detecting the linear deceleration of the vehicle, wherein said control circuit means has means, responsive to the detection of a sudden, predetermined increase in vehicle deceleration, for de-actuating all said rear brake inlet valves and said control valve means, actuated responsive to said sensor signals.

* * * * *